United States Patent
Winkler et al.

(10) Patent No.: US 8,230,357 B2
(45) Date of Patent: Jul. 24, 2012

(54) VISUALLY PROCESSING INSTANCE DATA

(75) Inventors: Matthew R. Winkler, Kenmore, WA (US); Ramrajprabu Balasubramanian, Renton, WA (US); Balasubramanian Shyamsundar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 12/338,852

(22) Filed: Dec. 18, 2008

(65) Prior Publication Data

US 2010/0162146 A1    Jun. 24, 2010

(51) Int. Cl.
*G06F 3/00*    (2006.01)

(52) U.S. Cl. ........ 715/771; 715/763; 715/856; 715/762; 715/761

(58) Field of Classification Search .................. 715/771, 715/763, 856, 762, 761
See application file for complete search history.

(56) References Cited

U.S. PATENT DOCUMENTS

| | | | |
|---|---|---|---|
| 5,168,441 A * | 12/1992 | Onarheim et al. ............... 700/17 |
| 5,187,788 A * | 2/1993 | Marmelstein .................. 717/109 |
| 5,247,693 A * | 9/1993 | Bristol ........................... 717/139 |
| 5,301,301 A * | 4/1994 | Kodosky et al. .............. 716/119 |
| 5,537,630 A * | 7/1996 | Berry et al. .................... 715/763 |
| 5,615,351 A | 3/1997 | Loeb |
| 5,682,482 A | 10/1997 | Burt et al. |
| 5,909,678 A * | 6/1999 | Bergman et al. ...................... 1/1 |
| 5,999,911 A | 12/1999 | Berg et al. |
| 6,549,221 B1 | 4/2003 | Brown et al. |
| 6,732,153 B1 | 5/2004 | Jakobson et al. |
| 7,003,781 B1 | 2/2006 | Blackwell et al. |
| 7,249,195 B2 | 7/2007 | Panec et al. |
| 7,409,408 B2 | 8/2008 | Conn et al. |
| RE42,101 E | 2/2011 | Chasen et al. |
| 2003/0195959 A1 | 10/2003 | Labadie et al. |
| 2004/0205638 A1 | 10/2004 | Thomas et al. |
| 2004/0225960 A1 | 11/2004 | Parikh et al. |
| 2004/0243938 A1 | 12/2004 | Weise et al. |
| 2005/0097536 A1 | 5/2005 | Bernstein et al. |
| 2005/0188349 A1 | 8/2005 | Bent et al. |
| 2006/0074733 A1 | 4/2006 | Shukla et al. |
| 2006/0075352 A1 | 4/2006 | Burke et al. |
| 2006/0242604 A1 | 10/2006 | Wong et al. |
| 2006/0248480 A1 | 11/2006 | Faraday et al. |
| 2006/0294051 A1 * | 12/2006 | Kapadia et al. .................... 707/1 |
| 2007/0245357 A1 | 10/2007 | Breiter et al. |
| 2008/0040191 A1 | 2/2008 | Chakravarty et al. |
| 2008/0092074 A1 * | 4/2008 | Cohen ............................ 715/771 |

(Continued)

OTHER PUBLICATIONS

Kolawa, Adam, "BPEL in a Service-Oriented Architecture", Jun. 2006, 8 pages.

(Continued)

*Primary Examiner* — Michael Roswell
(74) *Attorney, Agent, or Firm* — Workman Nydegger (57) ABSTRACT

The present invention extends to methods, systems, and computer program products for visually processing instance data. A visual placeholder for a data instance is provided as part of the design experience. A runtime configurable metadata store is provided to maintain the mappings between types and designers. Thus, configurations can be altered at the runtime of the control, rather than a fixed set of potential templates being provided at design time. Item presenters render contained data instances of a type using a designer specified in the metadata store. Item presenters can be used when a data instance is exposed as a property on the containing type. As such, property values can be visually moved to and from other properties, potentially within multiple owning objects.

20 Claims, 6 Drawing Sheets

U.S. PATENT DOCUMENTS

2008/0196018 A1   8/2008   Russ

OTHER PUBLICATIONS

Barga, Roger S., "Coping with Variable Latency and Disorder in Distributed Event Streams", Proceedings of the 26th IEEE International Conference on Distributed Computing Systems Workshops (ICDCSW'06), 2006, 6 pages.

IBM Corporation, "Correlation methods", 2000, 2004, 1 page.

Hanemann, Andreas, et al., "Service-Oriented Event Correlation—the MNM Service Model Applied to E-Mail Services", 2004, 14 pages.

Schmidt, Mark "WFPad—Viewing/Editing Workflow's in XML", 2005, 4 pages.

Hayden, David "Web Client Software Factory—Model-View-Presenter and Page Workflow", 2007, 7 pages.

Novell "Provisioning Workflow", Apr. 2004, 42 pages.

Wisniewski, Scott "Map LINQ: Create Dynamic Maps with Visual Basic 9.0 and WPF". 2008, 7 pages.

Chamberland, L.A., et al., "IBM VisualAge for Java", IBM Systems Journal vol. 37, No. 3, 1998, Java Technology, 17 pages.

Goldman, Kenneth J. "A Demonstration of JPie: An Environment for Live Software Construction in Java", OOPSLA'03, Oct. 26-30, 2003, ANaheim, CA, USA, 2 pages.

U.S. Appl. No. 12/338,859, filed Dec. 18, 2008, Winkler.

U.S. Appl. No. 12/338,859, filed Apr. 26, 2011, Office Action.

U.S. Appl. No. 12/338,859, filed Sep. 1, 2011, Notice of Allowance.

* cited by examiner

VISUALLY PROCESSING INSTANCE DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many computing tasks include an application program manipulating data in response to user commands to express the user's intent within the data file. For example, a word processor can modify the contents of a word processing document in response to user commands received through a user-interface of the word processor. Other application programs can be used to manipulate spreadsheets, database entries, images, executable software code, etc.

Some applications utilize graphical editors that permit a particular type of data to be edited. However, different types of data are typically visualized differently. Thus, when constructing a graphical editor for instances of a given type (e.g., Order), it is difficult to provide a mechanism that permits an editing experience to be composed with and used within editors for other types, such as for example, those that contain instances to the previous object. For example, it can be difficult to compose a Customer editor that permits Orders to be edited.

This problem can surface when creating an editing experience for workflow or other hierarchical data. Since workflow is typically composite in nature, shifts between different types of data are likely to occur. For example, any given element in a workflow may compose an arbitrary number of additional elements, and it is highly possible that each of those composed elements will in turn compose additional elements. When creating designers for these elements, some approaches permit the use of templates to define composed elements. A template is typically configured for use with a specific data type. As such, templates are useful if it is known beforehand what data types are to be visualized.

However, it is not uncommon for an element in a workflow or other hierarchical data to potentially be composed from a variety of different data types at different times. Thus, some locations in a workflow or hierarchy represent a location where any number of different data types might be visualized. However, at design time the data type that is to be visualized is typically unknown since the actual data types are not determined until runtime. As such, there is no way to identify the appropriate template to associate with the placeholder during design time.

BRIEF SUMMARY

The present invention extends to methods, systems, and computer program products for visually processing instance data. In some embodiments, data is visualized at a user interface. A root user interface is presented to visualize data from a data model. An item presenter is presented underneath the root user interface. The item presenter is configured as a child element of the root user interface. The item presenter is further configured to provide a visual place holder that can receive a portion of data from any of a plurality of different portions of the data model and determine at runtime a data type of data that is inserted into the visual place holder.

A portion of data from the data model is inserted into the visual placeholder (e.g., using drag and drop). The item presenter determines the data type of the portion of data. The item presented refers to a metadata store to determine a visualization associated with the data type. The metadata store includes one or more mappings that map between data types and visualizations. The item presenter instantiates an instance of the visualization within the placeholder to visualize the portion of data. The item presenter binds the portion of data to the visualization instance.

In other embodiments, a property value is moved between data visualizations. A property value is selected from an instantiated visualization within an item presenter. The instantiated visualization corresponds to the data type for the property value. The property value is moved from the item presenter to a second different item presenter. The second item presented refers to the metadata store to determine a visualization associated with the property value. Another instance of the visualization is instantiated within the second different item presenter to accommodate the property value. The property value is bound to the other visualization instance. A data element corresponding to the property value is relocated in a data model.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for visually processing instance data. In some embodiments, data is visualized at a user interface. A root user interface is presented to visualize data from a data model. An item presenter is presented underneath the root user interface. The item presenter is configured as a child element of the root user interface. The item presenter is further configured to provide a visual place holder that can receive a portion of data from any of a plurality of different portions of the data model and determine at runtime a data type of data that is inserted into the visual place holder. A portion of data from the data model is inserted into the visual placeholder (e.g., using drag and drop). The item presenter determines the data type of the portion of data. The item presented refers to a metadata store to determine a visualization associated with the data type. The metadata store includes one or more mappings that map between data types and visualizations. The item presenter instantiates an instance of the visualization within the placeholder to visualize the portion of data. The item presenter binds the portion of data to the visualization instance.

In other embodiments, a property value is moved between data visualizations. A property value is selected from an instantiated visualization within an item presenter. The instantiated visualization corresponds to the data type for the property value. The property value is moved from the item presenter to a second different item presenter. The second item presented refers to the metadata store to determine a visualization associated with the property value. Another instance of the visualization is instantiated within the second different item presenter to accommodate the property value. The property value is bound to the other visualization instance. A data element corresponding to the property value is relocated in a data model.

Embodiments of the present invention may comprise or utilize a special purpose or general-purpose computer including computer hardware, as discussed in greater detail below. Embodiments within the scope of the present invention also include storage and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of computer storage media and transmission media should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
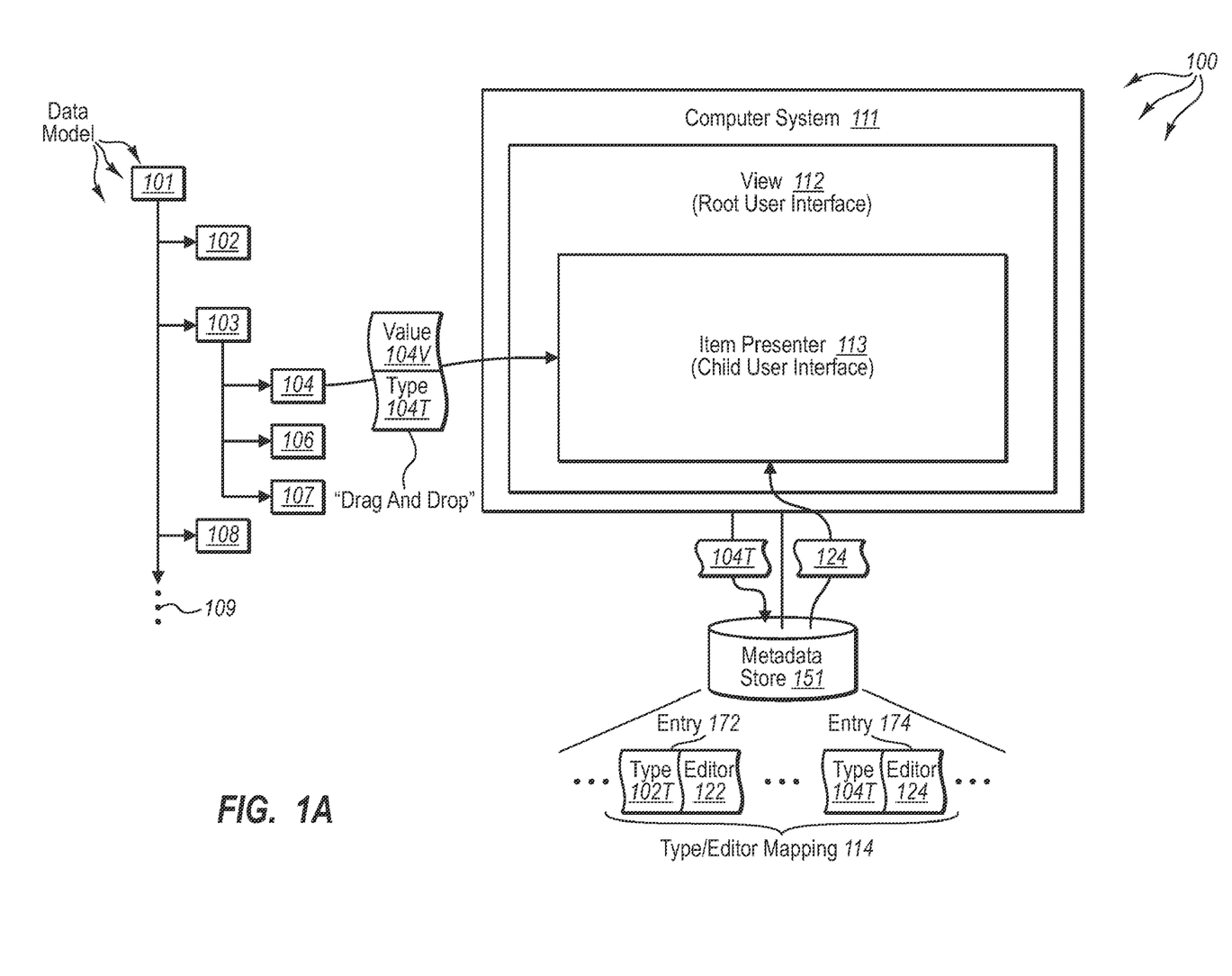
FIG. 1A illustrates an example computer architecture that facilitates visualizing data.

FIG. 1A illustrates an example computer architecture 100 that facilitates visualizing data. Referring to FIG. 1, computer architecture 100 includes computer system 111, metadata store 151, and data instance 101. Each of the depicted components can be connected to one another over (or be part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Data instance 101 can represent an instance of a portion of data from a file, a data base, Web service, or any other location. Data instance 101 is represented hierarchically to depict how different portions of data relate to one another. Data instance 101 can include one or more data elements that each includes one or more data sub-elements. Data sub-elements can also include further data sub-elements. As depicted, data instance 101 includes data elements 102, 103, and 108. Data element 103 further includes data sub-elements 104, 106, and 107. For example, data instance 101 can represent a customer. Element 102 can be a customer name, element 103 can be an address, and element 108 can be a telephone number. Sub-elements 104, 105, 106 can represent a street address, state, and zip code respectively. Vertical ellipsis 109 represents that data instance 101 can include further data elements and corresponding data sub-elements.

Embodiments of the invention are not limited to hierarchically composed data. For example, embodiments of the invention can be practiced with non-hierarchical data, such as, for example, graphs.

Computer system 111 can be configured with general purpose graphics functionality for presenting user interface elements at a video display device, such as, for example, a computer monitor or television. Thus, generally, computer system 111 can access data, for example, from data instance 101, and present the data through a user interface at a video display device. In some embodiments, computer system 111 presents a root user interface that includes one or more user interface elements, including child user interfaces.

A user interface designer can design a root user interface to include one or more child user interfaces. An item presenter is one example of a child user interface that can be included within a root user interface. During design time, an item presenter provides a visual placeholder indicating where data can be visualized at run time. For example, a designer can design view 112 (a root user interface) to include item presenter 113 (a child user interface). Thus, during the design of view 112, the designer is aware of where data is to surface during run time (even if the type of the data is not known at design time). Accordingly, a root user interface can be authored without express knowledge of the type of data that is to be presented in the future.

An item presenter can be configured with executable instructions (e.g., a handler) that are wired to data insertion events. A computer hardware component can cause a data insertion event. For example, a data insertion event can be a mouse related event, such as, for example, a drop event associated with a drag and drop operation implemented with a hardware mouse. Alternately, an insertion event can be a keyboard entry event associated manual insertion of data into a field.

In response to detecting a data insertion event, the executable instructions can be configured to create a new instance of a dropped object, create an editing experience for the new instance of the dropped object based on the data type of the dropped object, and visually display the editing experience. For example, executable instructions can be configured to automatically create a new instance without user intervention. Thus, during run time, when data is inserted at (e.g., dropped into) an item presenter, a processor executes the executable instructions to (e.g., automatically) determine the data type (e.g., character, string, integer, binary, user-defined, workflow, sequence, data structure, etc.) of the inserted data and present an appropriate editor for the inserted data.

Metadata store 151 includes type/editor mapping 114. Type/editor mapping 114 includes entries, such as, for example, entries 172 and 174, that map data types to corresponding visualizations/editors. For example, entry 172 maps type 102T (e.g., string) to editor 122 (e.g., a character editor). Similarly, entry 174 maps type 104T (e.g., a workflow) to editor 124 (e.g., a workflow editor). In order to resolve the editor to be presented at runtime, an item presenter can refer to metadata store 151. Accordingly, executable instructions of an item presenter can query metadata store 151 with a data type to determine the corresponding editor for the data type. For example, executable instructions can automatically query metadata store 151 without further user intervention. Through reference to metadata store 151, configurations can be (e.g., automatically) altered at runtime, such as, for example, to accommodate a specified data type.

In some embodiments, an item presenter is added to a root user interface and subsequently configured using the combination of a markup language and a graphical presentation foundation. For example, an item presenter can be added and configured in accordance with Windows Presentation Foundation ("WPF") and Extensible Application Markup Language ("XAML") as depicted in the following code sample:

<Border BorderThickness="3 " Margin="10,10">
   TextBlock HorizontalAlignment="Center" Text="{Path=Customer.Name}"/>
   <WorkflowItemPresenter Item=="{Binding Path=Customer, Mode=TwoWay}"/>
</Border>

The code sample can be used to configure an item presenter with the indicated border thickness and margins. Text from a Customer.Name data element is bound to and horizontally aligned and centered within the item presenter. At runtime for a root user interface, the WPF data binding can be used to resolve the instance to be rendered inside the item presenter. When the binding is not yet set, for example, because the underlying value has not been set, the item presenter presents a configurable string of text indicating what the user is supposed to drop onto the surface. The user can then drag and drop from a toolbox, or from elsewhere in the root user interface and drop a data element onto the item presenter. Dropping a data element causes (e.g., in response to a handler detecting a drop event) the item presenter to add a new instance (e.g., in the toolbox case), or add a reference at the bound property value to the dropped item.

Figure 2:
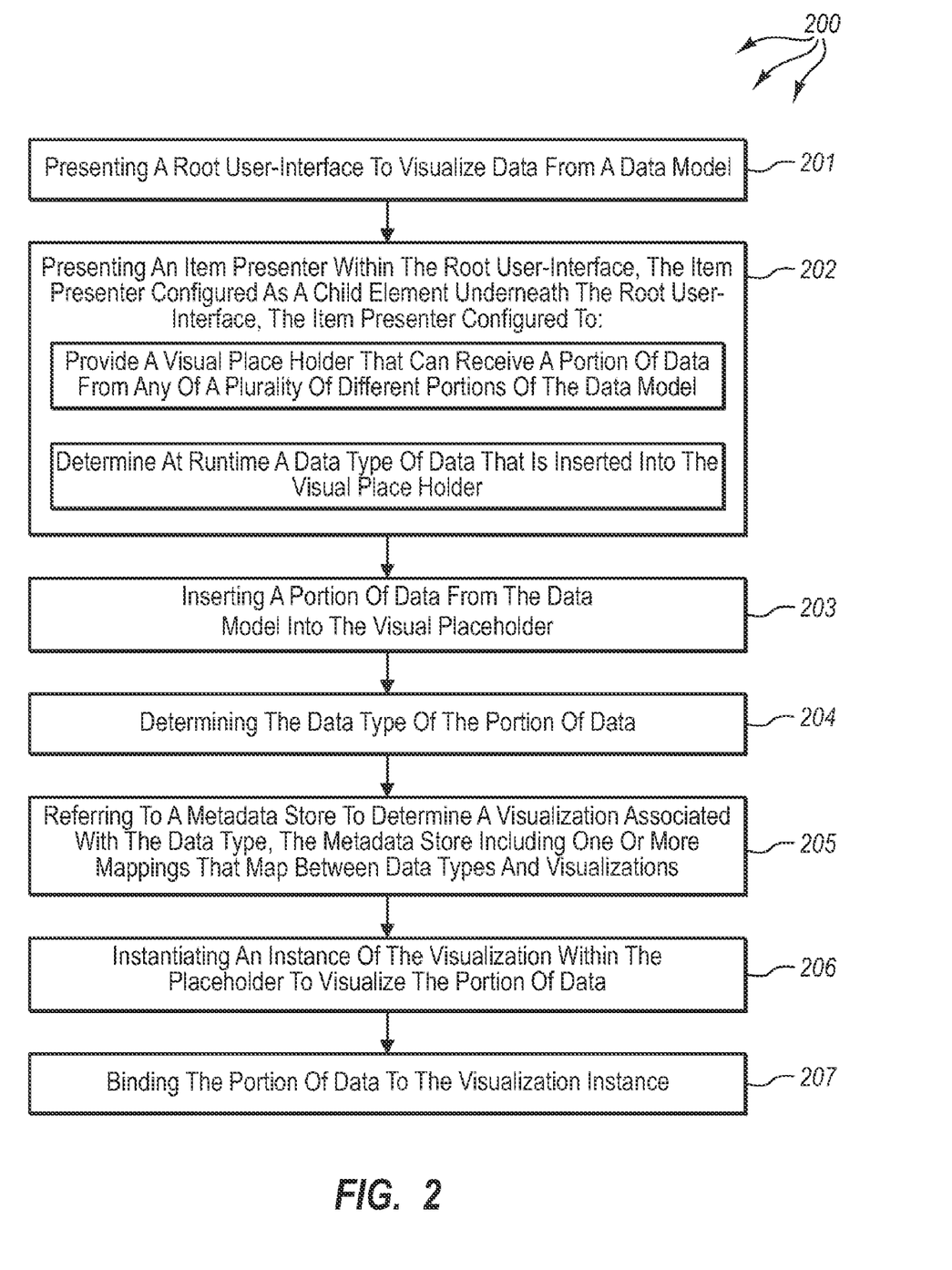
FIG. 2 illustrates a flow chart of an example method for visualizing data.

FIG. 2 illustrates a flow chart of an example method 200 for visualizing data. Method 200 will be described with respect to the components and data in FIG. 1A.

Method 200 includes an act of presenting a root user interface to visualize data from a data model (act 201). For example, computer system 111 can present view 112 to visualize data from data instance 101.

Method 200 includes an act of presenting an item presenter within the root user interface, the item presenter configured as a child element underneath the root user interface (act 202). The item presenter is further configured to provide a visual place holder that can receive a portion of data from any of a plurality of different portions of the data model and determine at runtime a data type of data that is inserted into the visual place holder. For example, computer system 111 can present item presenter 113 as a child user interface element underneath view 112 and within view 112. Item presenter 113 can be placed anywhere underneath view 112. For example, item presenter 113 can be a direct child user interface element of view 112. Alternatively, item presenter 113 can be the child user interface element of some other child user interface element within view 112. Item presenter 113 is configured to provide a visual place holder that can receive any of a plurality of different data elements form from data instance 101. Item presenter 113 is also configured to determine the data type of data received at item presenter 113.

Method 200 includes an act of inserting a portion of data from the data model into the visual placeholder (act 203). For example, data element 104 can include value 104V and represent data type 104T (e.g., string). Value 104V and data type 104T can be received at item presenter 113. For example, a user can drag data element 104 form outside of view 112 and drop data element 104 into item presented 113.

Method 200 includes an act of determining the data type of the portion of data (act 204). For example, item presenter 113 (e.g., through a configured handler) can determine that value 104V is of data type 104T. Method 200 includes an act of referring to a metadata store to determine a visualization associated with the data type, the metadata store including one or more mappings that map between data types and visualizations (act 205). For example, item presenter 113 can query metadata store 151 for an editor corresponding to data type 104T. Metadata store 151 can refer to entry 174 to determine that type 104T corresponds to editor 124. Editor 124 (or a reference to editor 124) can be returned to item presenter 113.

Method 200 includes an act of instantiating an instance of the visualization within the placeholder to visualize the portion of data (act 206). For example, item presenter 113 can instantiate an instance of editor 124 within the item presenter 113 to visualize value 104V. Method 200 includes an act of binding the portion of data to the visualization instance (act 207). For example, item presenter 113 can bind value 104V to editor 124.

Figure 1B:
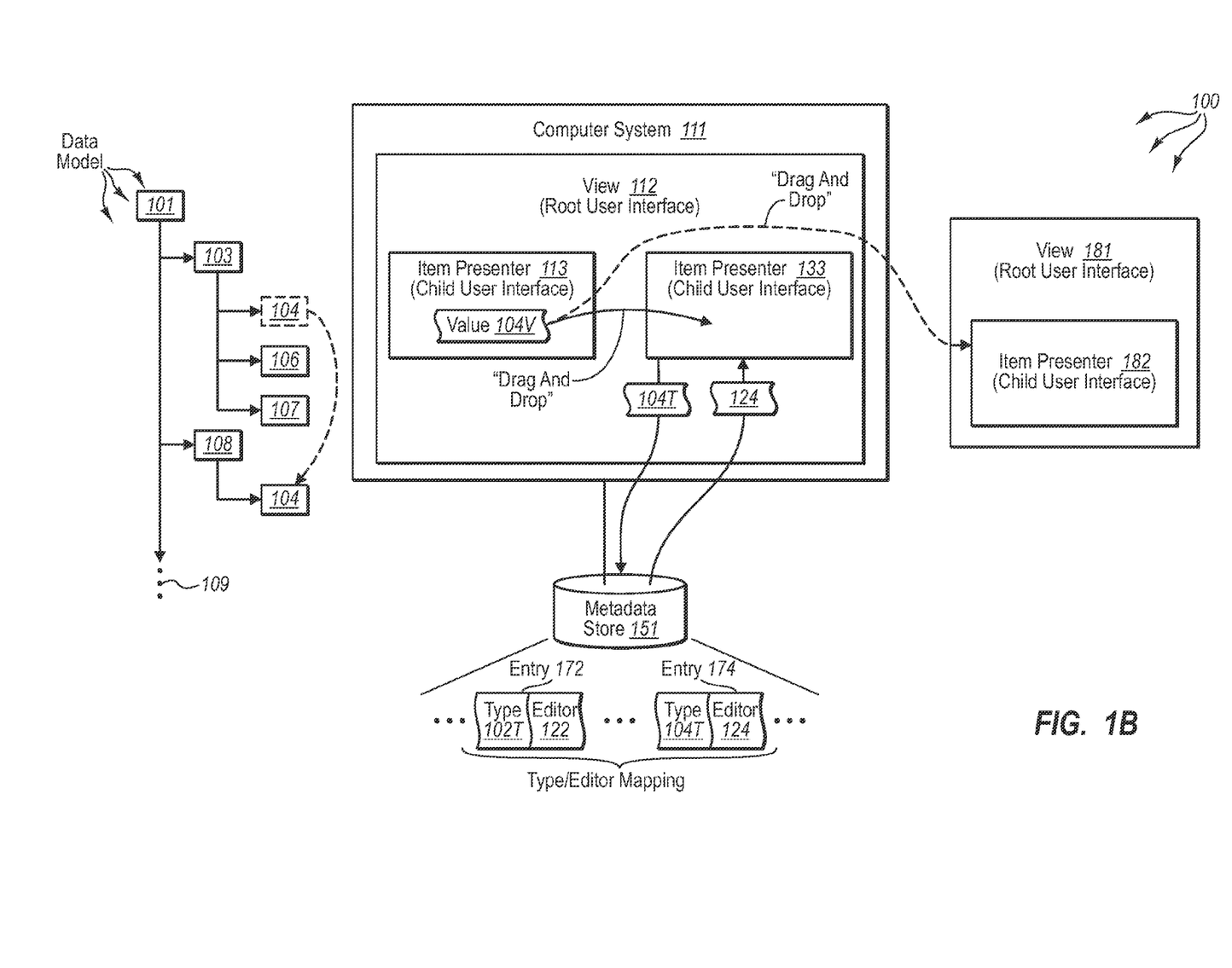
FIG. 1B illustrates an example computer architecture that facilitates moving a property value between visualizations of data
Figure 3:
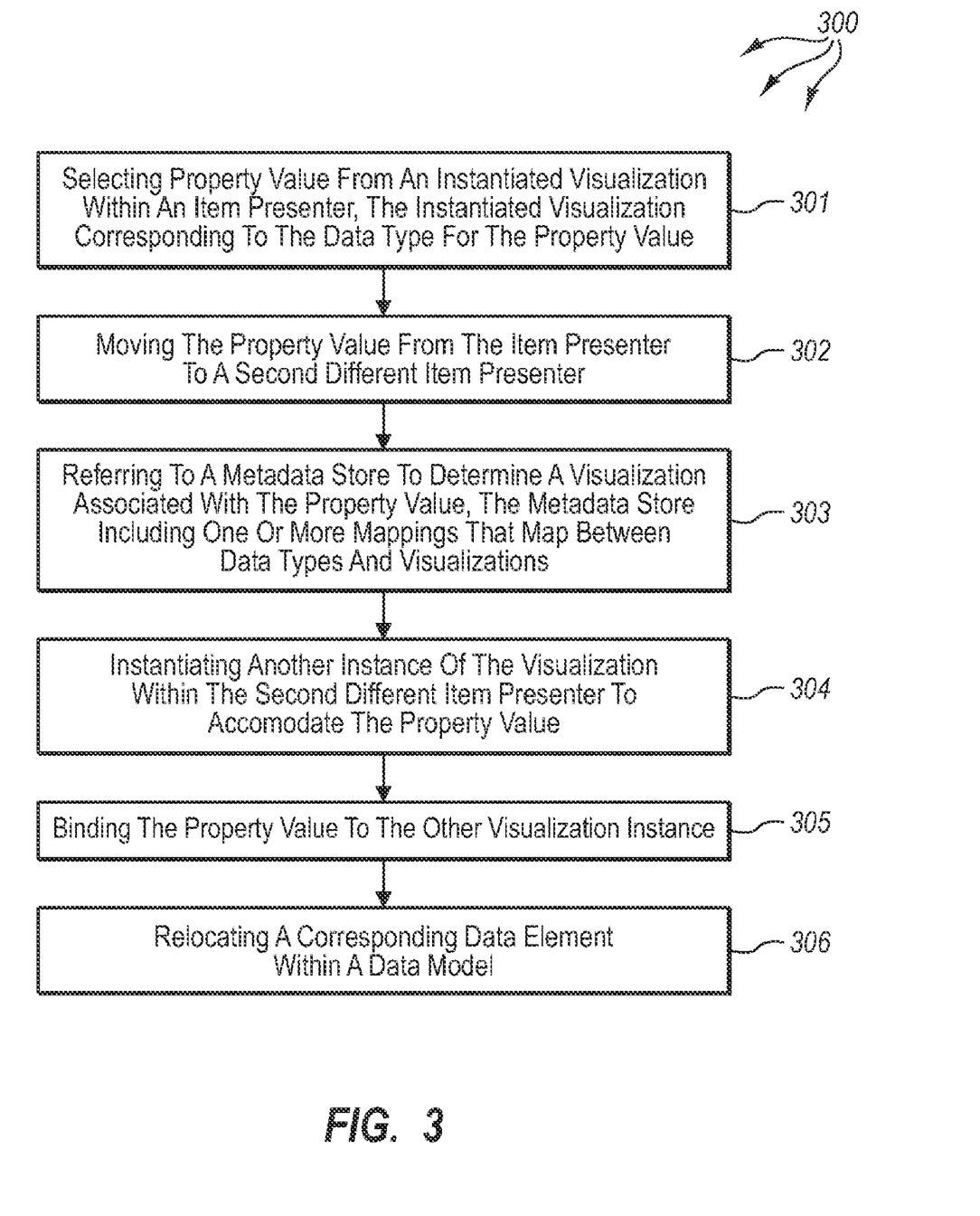
FIG. 3 illustrates a flow chart of an example method for moving a property value between visualizations of data.

Embodiments of the invention can also be used to transfer properties between visualizations of data. FIG. 1B illustrates computer architecture 100 that facilitates moving a property value between visualizations of data. FIG. 3 illustrates a flow chart of an example method 300 for moving a property value between visualizations of data. Method 300 will be described with respect to the components can data in FIG. 1B.

Method 300 includes an act of selecting property value from an instantiated visualization within an item presenter, the instantiated visualization corresponding to the data type for the property value (act 301). For example, value 140V can be selected form from item presenter 113. Method 300 includes an act of moving the property value from the item presenter to a second different item presenter (act 302). For example, value 104V can be moved to item presenter 133, such as, for example, using drag and drop.

Method 300 includes an act of referring to a metadata store to determine a visualization associated with the property value, the metadata store including one or more mappings that map between data types and visualizations (act 303). For example, item presenter 133 can query metadata store 151 for an editor corresponding to data type 104T. Metadata store 121 can refer to entry 174 to determine that type 104T corresponds to editor 124. Editor 124 (or a reference to editor 124) can be return to item presenter 133.

Method 300 includes an act of instantiating another instance of the visualization within the second different item presenter to accommodate the property value (act 304). For example, item presenter 113 can instantiate another instance of editor 124 within the item presenter 133 to accommodate value 104V. Method 300 includes an act of binding the property value to the other visualization instance (act 305). For example, item presenter 133 can bind value 104V to editor 124.

Method 300 also includes an act of relocating a corresponding data element in a data model (act 306). For example, it may be that item presenter 113 corresponds to data element 103 and that item presenter 133 corresponds to data element 108. Thus, when value 104V is moved from item presenter 113 to item presenter 133, data element 104 can correspondingly be relocated in data model 101. For example, data element 104 can be relocated from depending from data element 103 to depending from data element 108.

Item values can also be dragged and dropped between item presenters in different root user interfaces. For example, value 104V can be dragged from item presenter 113 to item presenter 182 in view 181. Item presenter 182 can then refer to metadata store 151 to obtain editor 124. View 181 can be located at computer system 111 or at a different computer system.

Embodiments of the invention include item presenters that are isolated from their corresponding root user interface. Item presenters can be isolated by process and/or memory. Thus, changes to item presenters, such as, for example, instantiations of specified visualizations, can be implemented with out interfering with the functionality of root user interface. For example, editor 124 can be instantiated in item presenter 113 without interfering with view 112. Accordingly, composable user interfaces can be designed more efficiently.

In some embodiments, configurations are selected based on input in addition to data type. It may be that a plurality of different editors are configured for use and/or compatible with a specified data type. Some editors can have additional and/or more advanced features relative to other editors. Selecting an editor with a specific feature set can be based on the additional input. The additional input can include available system resources, hardware configuration, user account type, etc. For example, a user with a "premium" account may have access to a more advanced editor than a user with a "normal" account.

Thus, in addition to submitting a data type to metadata store 151, an item presenter can also submit other data to assist metadata store 151 in referring to the correct mapping. Metadata store 151 can include additional modules and data for managing editor selections based on other kinds of input. For example, mappings can also include additional metadata indicating availability to "premium" accounts or to "normal" accounts, not for use in limited memory environments, not compatible with specified hardware configurations, preferred in limited memory environments, preferred for specified hardware configurations, etc. When a request for an editor is received, this additional metadata can be used when selecting an editor to return. For example, when a request form a "normal" account is received, an editor specific to "normal" accounts can be returned.

Figure 4A:
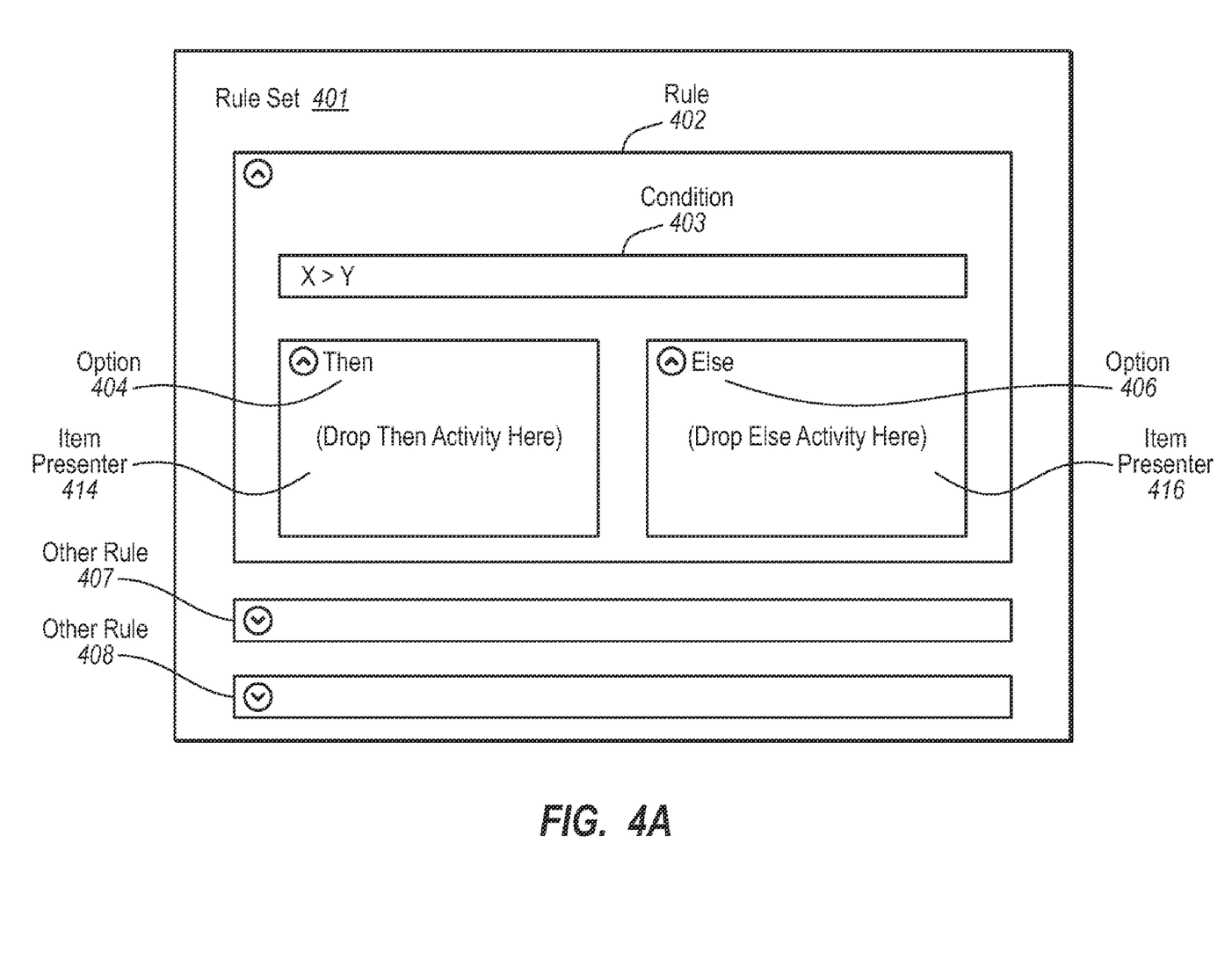
FIGS. 4A and 4B illustrate an example of using item presenters to design and populate rule sets.
Figure 4B:
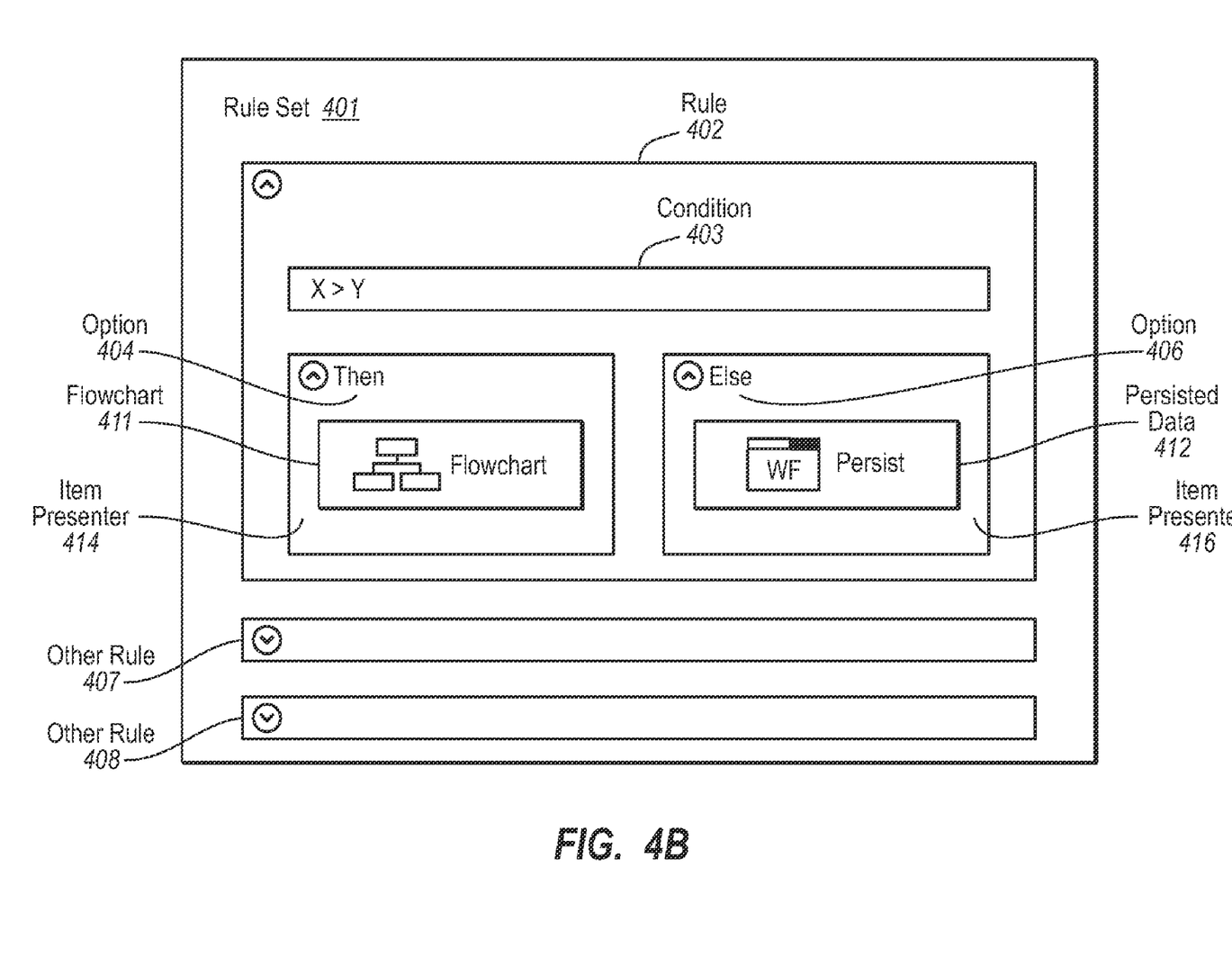

Embodiments of the invention can also be used to design and populate rule sets using item presenters. For example, FIGS. 4A and 4B illustrate an example of using item presenters to design and populate rule set 401. Referring to FIG. 4A, rule set 401 includes rules 402, 407, and 408. Some rules within rule set 401 include different options for visualizing different types of data under different conditions. For example, rule 402 includes condition 403 and options 404 and 406. Depending on whether condition 403 is TRUE or FALSE option 404 or 406 is selected respectively. That is if 'x' is greater than 'y' option 404 is selected. On the other hand, if 'x' is not greater than 'y' option 406 is selected.

During design of rule set 401, item presenters 414 and 416 serve as visual placeholders indicating where data is to surface, such as, for example, what a user is to drop onto item presents 414 and 416 (even if the type of data is not known at design time). The text "(drop then activity here)" and "(drop else activity here)" represents configurable display text indicative of a purpose for item presenters 414 and 416 respectively. The configurable display text can remain in an item presenter until the item presenter is populated with actual data at run time.

Referring now to FIG. 4B, flow chart 411 is instantiated in item presenter 414 and persisted database data 412 is instantiated in item presenter 416. Using drag and drop, a user can drag flow chart 411 and persisted database data 412 from outside of rule set 401, and drop flow chart 411 and persisted database data 412 into item presenters 414 and 416 respectively. A user can subsequently interact with other rules, such as, for example, rules 407 and 408. Alternately, the user can explore flow chart 411 and potentially instantiate other values within flow chart 411.

Accordingly, embodiments of the invention facilitate drag and drop solutions with a richer customization experience. A visual placeholder for an instance is provided as part of the design experience. A runtime configurable metadata store is provided to maintain the mappings between types and designers. Thus, configurations can be altered at the runtime of the control, rather than a fixed set of potential templates being provided at design time. Item presenters render contained instances of a type using a designer specified in the metadata store. Item presenters can be used when an instance is exposed as a property on the containing type. As such, property values can be visually moved to and from other properties, potentially within multiple owning objects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for visualizing data, the method comprising:
    an act of the computer system presenting a root user interface to visualize data from a data model;
    an act of the computer system presenting an item presenter underneath the root user interface, the item presenter being configured as a child element of the root user interface, the item presenter being configured to:
        provide a visual place holder that is configured to receive a portion of data from any of a plurality of different portions of the data model, the visual place holder being configured to receive data of different types; and
        determine, at a runtime of the item presenter, a data type of data that is inserted into the visual place holder;
    an act of inserting a particular portion of data from the data model into the visual placeholder, the particular portion of data having at least one value of a particular data type;
    based at least in part on the particular portion of data being inserted into the visual placeholder, an act of the computer system determining the particular data type of the particular portion of data;
    an act of the computer system referring to a metadata store to determine a particular editor associated with the particular data type, the metadata store including one or more mappings that each map a different data type to a corresponding particular editor, including a mapping that maps the particular data type to the particular editor;
    an act of the computer system instantiating an instance of the particular editor within the placeholder to visualize the particular portion of data and to enable a user to edit the at least one value of the particular portion of data using the particular editor; and
    an act of the computer system binding the particular portion of data to the particular editor.

2. The method as recited in claim 1, wherein the act of presenting an item presenter underneath the root user interface comprises an act of presenting an item presenter with a configurable text string indicating what the user is to drop onto the item presenter.

3. The method as recited in claim 1, wherein the act of presenting an item presenter underneath the root user interface comprises an act of presenting an item presenter within a rule set at design time.

4. The method as recited in claim 1, wherein the act of inserting a particular portion of data from the data model into the visual placeholder comprises an act of receiving user input dragging the particular portion of data from outside of the root user interface and dropping the particular portion of data on the item presenter.

5. The method as recited in claim 1, wherein the act of inserting a particular portion of data from the data model into the visual placeholder comprises an act of inserting the particular portion of data at the runtime of the item presenter.

6. The method as recited in claim 1, wherein determining, at a runtime of the item presenter, a data type of data comprises an act of determining that the data type is one of: an integer, a string, a character, a workflow, or a data structure.

7. The method as recited in claim 1, wherein an act of referring to a metadata store to determine a particular editor associated with the particular data type comprises an act of submitting the particular data type of the particular portion of data to the metadata store.

8. The method as recited in claim 7, further comprising:
    an act of the computer system submitting additional data related to one of: system resources, hardware configuration, or user account type to the metadata store along with the particular data type.

9. The method as recited in claim 1, wherein the act of binding the particular portion of data to the particular editor comprises an act of binding the portion of data in accordance with mark-up language instructions configured for use with a graphical presentation foundation.

10. The method as recited in claim 1, further comprising:
    an act of the computer system isolating the item presenter from the root user interface, such that any item presented does not interfere with operation of the root user interface.

11. At a computer system including one or more processors and system memory, a method for moving a value between data editors, the method comprising:
    an act of the computer system selecting a value from an instantiated editor within an item presenter, the instantiated editor corresponding to the data type for the property value;
    an act of the computer system moving the value from the item presenter to a second different item presenter, the second different item presenter being configured to receive values having various data types;
    in response to moving the value from the item presenter to the second different item presenter, an act of the computer system referring to a metadata store to determine an editor that is associated with a data type of the value, the metadata store including one or more mappings that map between data types and editors;

an act of the computer system instantiating another instance of the editor within the second different item presenter to accommodate the value placeholder to visualize the particular portion of data to enable a user to edit the value using the other instance of the editor within the second different item presenter;

an act of the computer system binding the value to the other editor instance; and based on moving the value from the item presenter to a second different item presenter, an act of the computer system relocating a data element corresponding to the value in a data model.

12. The method as recited in claim 11, wherein the act of selecting a value from an instantiated editor within an item presenter comprises an act of selecting a property-value selected from among: a string value, a character value, an integer value, and a workflow value.

13. The method as recited in claim 11, wherein the act of moving the value from the item presenter to a second different item presenter comprises an act of moving the value within the same root user interface.

14. The method as recited in claim 11, wherein the act of moving the value from the item presenter to a second different item presenter comprises an act of moving the value from a first root user interface to a second different root user interface.

15. The method as recited in claim 11, wherein the act of moving the value from the item presenter to a second different item presenter comprises an act of dragging the value from the item presenter to the second item presenter and dropping the value on the second different item presenter.

16. The method as recited in claim 11, wherein an act of referring to a metadata store to determine an editor that is associated with a data type of the value comprises an act of submitting the data type for the value the metadata store.

17. The method as recited in claim 11, wherein the act of binding the value to the other editor instance comprises binding the value in accordance with mark-up language instructions configured for use with a graphical presentation foundation.

18. A computer program product for use at a computer system, the computer program product for implementing a method for visualizing data, the computer program product comprising one or more computer storage media having stored thereon computer-executable instructions that, when executed at a processor, cause the computer system to perform the following:

present a root user interface to visualize data from a data model;

add an item presenter as a child element of the root user interface, the item presenter including:
a visual place holder that is configured to receive a portion of data from any of a plurality of different portions of the data model, the visual place holder being configured to receive data of various types; and
a handler wired to a user interface drop event, the handler being configured to create a new instance of a dropped object, to create an editing experience of the new instance of the dropped object based on the data type of the dropped object, and to visually display the editing experience;

detect that a portion of data has been dropped onto the item presenter;

execute the further executable-instructions to:
subsequent to detecting that the portion of data has been dropped onto the item presenter, identify the data type of the portion of data;
call a metadata store to determine an editing experience for the identified data type, the metadata store storing one or more mappings that each map a different data type to a corresponding different editing experience;
bind the item presenter to the portion of data in accordance with mark-up language instructions; and
instantiate an instance of the editing experience within the placeholder to visualize the portion of data and to enable a user to edit at least one value of the portion of data using the editing experience.

19. The computer program product as recited in claim 18, wherein computer-executable instructions that, when executed at a processor, cause the computer system to add an item presenter as a child element of the root user interface comprise computer-executable instructions that, when executed at a processor, cause the computer system to add an item presenter within a rule set at design time.

20. The computer program product as recited in claim 18, wherein computer-executable instructions that, when executed at a processor, cause the computer system to call a metadata store to determine an editing experience for the identified data type comprises computer-executable instructions that, when executed at a processor, cause the computer system to call the metadata store with the identified data type and additional data related to one of: system resources, hardware configuration, or user account type.

* * * * *